United States Patent [19]
Angelovich

[11] 3,791,873
[45] Feb. 12, 1974

[54] CLOSURE SEAL FOR ELECTROCHEMICAL CELLS
[75] Inventor: Stephen J. Angelovich, Yonkers, N.Y.
[73] Assignee: P. R. Mallory & Co., Inc., Indianapolis, Ind.
[22] Filed: Nov. 2, 1970
[21] Appl. No.: 85,840

[52] U.S. Cl. .............................................. 136/133
[51] Int. Cl. ............................................. H01m 1/02
[58] Field of Search...................... 136/133, 134, 83

[56] References Cited
UNITED STATES PATENTS

| | | | |
|---|---|---|---|
| 3,114,085 | 12/1963 | Ruscetta et al. | 136/133 |
| 3,237,060 | 2/1966 | Ross | 136/133 |
| 3,332,802 | 7/1967 | Clune et al. | 136/6 |
| 3,484,301 | 12/1969 | Gray | 136/133 |
| 3,143,441 | 8/1964 | Coleman et al. | 136/133 |

Primary Examiner—A. B. Curtis
Assistant Examiner—H. A. Feeley
Attorney, Agent, or Firm—Robert Levine

[57] ABSTRACT

A Closure Seal for an electrochemical cell comprises a metal can constituting one of the terminals of the cell, a top closure means for the can constituting the other terminal of the cell, an insulating sealing means confined between cooperating portions of the can and of the closure means, a radial constriction in the upper wall portion of said can and spaced below the sealing means, and an insulating supporting member positioned into the space below said sealing means and above said constriction.

When the upper rim of the metal can is crimped down to press against the sealing means thereby to seal the cell, the supporting member prevents distortion of the sealing means.

4 Claims, 2 Drawing Figures

PATENTED FEB 12 1974　　　　　　　　　3,791,873

INVENTOR
STEPHEN J. ANGELOVICH
BY
ATTORNEY

CLOSURE SEAL FOR ELECTROCHEMICAL CELLS

This invention relates to the prevention of leakage from batteries and to leakproof sealing and closure structures for electrochemical cells which contain cell active materials that undergo deactivation or power losses during shelf life storage of the cell when the cell is not in use.

With the ever-increasing demand by the public for battery powered portable devices, the need for reliable, leak-proof portable sources of electric power has grown tremendously in recent years. This need varies from a few microamperes per hour to several ampere hours per volt, and from a continuous delivery of current for the entire service life of the cell, to pulses of a few seconds at a time between long intervals of non-use. Where there are these long intervals of non-use, such as during shelf life storage of the battery or during periods of no power demand after installation of the battery into a device, it has been discovered that there is a tendency for impurities and contaminants to diffuse into the battery and to react with the cell active materials therein. The reaction of contaminants consumes the vital energy producing materials of the cell, so that a resultant deactivation of the cell occurs producing a decreased power availability per unit time of non-use of the battery.

Accordingly, it is an object of the present invention to prevent leakage of materials from batteries and the contamination of cell active materials.

It is a further object of the present invention to provide an improved closure seal for electrochemical cells.

Other and further objects and advantages of the invention will become apparent from the following description, taken in conjunction with the accompanying drawing, in which.

Generally speaking, this invention solves the problem of preventing the contamination of the active materials in a battery cell, caused by the presence of foreign matter impurities that may enter the battery.

Figure 1:
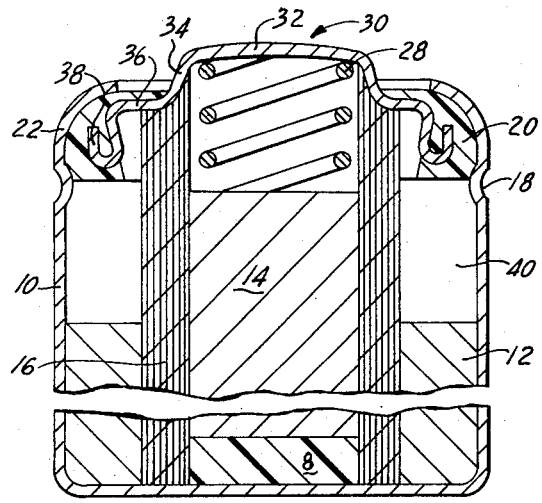
FIG. 1 is a longitudinal view of the upper portions of a previously constructed cell showing a distorted grommet and an imperfect closure seal.

In the past attempts have been made to improve the closure of structures and then to prevent leakage. For example, a former closure for the cell was made by forming a radial constriction or bead in the wall of the battery container can and using this constriction as a support for the sealing grommet. Such a structure is shown in FIG. 1. However, there was a tendency for the grommet or the seal to be driven past the bead and thus to dissort both the grommet and the bead. In the present construction in contradistinction thereto an insert has now been designed to be placed on top of the bead. The bead's only function, then, is to support this insert which can readily be done, while importantly, the insert provides a strong flat surface for the grommet which prevents distortion of the grommet and top assembly during crimping down of the open end of the metal battery container can. This makes for a much more efficient structure and provides improved sealing capability.

Figure 2:
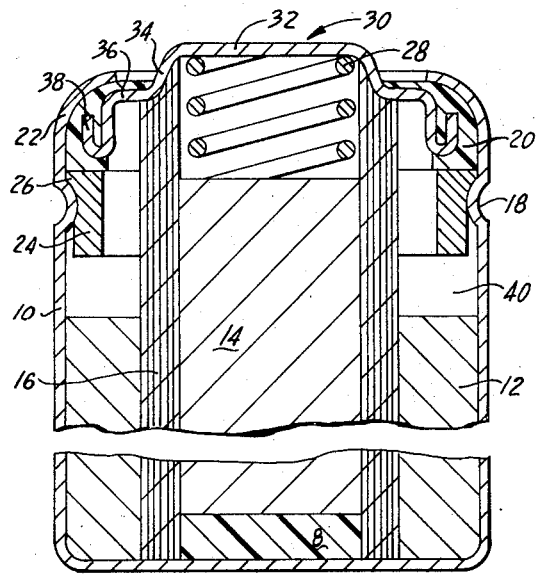
FIG. 2 is a longitudinal view of the upper portions of a cell constructed according to the present invention showing a perfected closure seal.

Referring now more particularly to FIGS. 1 and 2 of the drawing, reference numeral 10 denotes the side wall of a cylindrical can of steel or nickel-plated steel that acts as the positive terminal for the positive cathodic electrode 12 which is a depolarizer cell active material composed of manganese dioxie, mercuric oxide, or of a combination of both, intermixed with a suitable inert and electronically conductive filler material, such as graphite. One or more annular self-supporting depolarizer bodies are pressed from a mixture of 91 percent by weight electrolytic manganese dioxide and 9 percent by weight of graphite although other proportions can be used, for example 5 percent to 20 percent graphite.

The dimensions of the pressed depolarizer are such that a tight fit and good electrical contact is made with the inner surface of the side wall 10 and the closed bottom surface of the metal can. The negative anodic electrode 14 is made of amalgamated zinc powder which is pressed either into hollow or into solid self-supporting cylinders of suitable dimensions, so that the anode may be placed within the inner wall of the cathode and spaced sufficiently therefrom. Between the anode and the cathode is inserted several layers of an absorbent spacer material 16, such as dexter paper and/or parchment paper, which surround the outside surface of the anode material and is surrounded by the inside surface of the cathode material. The function of the absorbent spacer material is to maintain the presence of a suitable electrolyte, such as 35–40% KOH, 3.5–6.5% ZnO, the balance water, in contact with the electrodes while providing a suitable ionically permeable barrier material.

To insure reliable and permanent electrical connection between the negative electrode 14 and the top closure means negative terminal 30, there is provided a contact member 28 in the form of a helical spring made of tin-plated brass wire. If the anode 14 were a solid cylinder then the spring 28 would be made weak enough not to crush the anode yet be sufficiently resilient to insure positive electric contact between the anode and its terminal. If the anode were a hollow cylinder, the spring 28 would be shaped as shown and described in U.S. Pat. No. 3,332,802 to Clune et al.

Beneath the anode is a tight fitting insulator slug 8 of hard flexible rubber, for example, which is positioned within the separator paper so as to separate the anode and cathode and also to absorb energy upon compression of the spring during crimping and sealing of the upper rim of the walls 22.

Top closure means 30 comprises an inverted flat bottomed dish having a side wall 34 extending obliquely downwardly toward the bottom of the can 10 and away from the center of the flat bottomed portion 32 of the dish. The side wall terminates in a rim wall 36 extending circumferentially around the side wall and extending outwardly away from the center of the flat bottomed portion of the dish, while being substantially parallel to the flat portion 32. The rim wall terminates in a U-shaped wall 38 opening upwardly and facing outwardly away from the center of the flat bottomed portion of the dish with the U-shaped wall being substantially perpendicular to the flat portion 32.

An insulating and sealing grommet 20 of a suitable elastomer, such as high density polyethylene, is molded around the circumferential ridges and walls of the dish 30, with U-shaped wall 38 advantageously serving to provide additional surface area for adhesion of the grommet thereto.

Spaced below the top closure means 30 and the sealing means grommet 20 is a bead, or radial construction 18, formed in upper wall portion of the can by shallow drawing flat sheet metal before the sheet is bent into a circular shape and edge sealed to form the cylinder 10. Methods of sealing the top portions of an electrochemical cell are shown in FIGS. 1 and 2, wherein a seal is formed by crimping down the top mouth portion 22 of the can 10 against the outer surface of the grommet 20, pushing the grommet downward to engage the bead 18 and to use the bead as a support for the grommet. From FIG. 1 it is readily appreciated that when crimping the cell certain undesirable structural changes that place inside the cell. In crimping the cell, the top closure structure is bent downward along walls 34, 36, and 38, with the greatest deflection being in wall 38. Instead of the bead supporting the grommet, the tendency is for the grommet to be driven past the bead and thereby distort the grommet to such an extent that a good seal could not readily be achieved, since a firm seating was not available for the grommet. This distortion of the grommet created minute diffusion passages, not readily detectable, through which contaminants migrated into the cell and caused deactivation of the vital cell active components.

It was found that in order to solve the problem and to provide a satisfactory seal, an insert support 24 was designed so as to be inserted into the space above the bead 18 and below the grommet 20 before the grommet is placed into the can 10. The bead's only function is to then support this insert 24, which can readily be done, while the insert provides a strong flat surface for supporting the grommet which prevents distortion of the grommet and of the top terminal assembly during cirmping down of the open end of the metal can 10.

Referring now to FIG. 2, it can be seen that the structure of the insert supporting member 24 comprises an annular disc haeing a flanged outer shoulder 26, the disc being composed of an insulating elastomer plastic such as high density polyethylene or polypropylene. After insulator 8, cathode 12, insulation paper 16, and anode 14 are placed in the can 10, the supporting member 24 is inserted into space 40 around the bead and above the cathode 12. The inside diameter of both the grommet 20 and the insert 24 are each greater than the combined diameters of the anode and the unsulation paper so as to prevent contact with said paper. When the sealing means 20 is placed atop the insert support 24, the insert becomes located into that space below the sealing means and at the same time above the constriction 18, with the insert shaped to fit flush with both the sealing grommet and the constriction. The snug flush fit between these three elements results from the design of the supporting member's flanged outer shoulder 26 which comprises an upper portion and a lower portion. The upper portion possesses a right angular cross-section to fit in contact with the flat bottom wall of the grommet and simultaneously in contact with the portion of the metal can wall substantially perpendicular to the grommet bottom wall. The lower portion of the flanged outer shoulder is of concave curvature corresponding to the concave curvature of the insert radial constriction 18 which opens outwardly away from the centerline of the cell. When the upper rim of the metal can is crimped down to press against the sealing means to closure seal the cell, the grommet transmits this sealing force so as to compress the flanged outer shoulder 26 against the bead 18. The compressive strength and resiliency of the insert supporting member will cause its shoulder to retain the above described shape when the shoulder of the insert has become locked into position above the bead and below the grommet. While the contact spring 28 electrically interconnects the anode 14 with the negative terminal 30 along the flat bottomed surface 32, the spring also functions to cause the walls 34, 36, and 38 to urge the sealing means 20 against the crimped rim 22 of the can and simultaneously against the upper portion of the supporting member.

When a group of test cells were constructed according to the invention as described above, the shelf life of these cells was found to be at least twice that of cells having a conventional construction and in many instances, three times the shelf life of prior art cells. From these comparative test results, the great superiority of the cells of this invention over conventional cells becomes clearly apparent.

While the invention is illustrated and described in its preferred embodiments, it will be understood that modifications and variations may be affected without departing from the scope of the novel concepts of this invention.

What is claimed is:

1. A leakproof closure seal for an electrochemical cell comprising:
   1. a metal can constituting one of the terminals of the cell, said can having an upper rim which is subsequently crimped to seal the cell;
   2. a top closure means for said can constituting the other terminal for the cell, said top closure means comprising an inverted flat bottomed dish having a side wall extending downwardly away from the center of the flat bottomed portion of said dish, said side wall terminating in a rim wall extending circumferentially around said side wall and outwardly away from the center of the flat bottomed portion of said dish, and said rim wall terminating in a U-shaped wall opening upwardly and facing outwardly away from the center of the flat bottomed portion of said dish and being substantially perpendicular thereto;
   3. an insulating sealing grommet confined between cooperating portions of said metal can and of said top closure means;
   4. a radial constriction in the upper wall portion of said metal can and spaced below said sealing grommet;
   5. an insulating support member positioned into the space below said sealing grommet, with the upper portion thereof positioned above said radial constriction and shaped to fit flush with both said sealing grommet and said radial constriction, said supporting member comprising an annular disc having a flanged outer shoulder, said outer shoulder having an upper portion of right angular cross section to fit in simultaneous contact with said sealing grommet and with said metal can wall, and a lower portion of concave curvature corresponding to the curvature of said radial constriction;
   6. a helical contact spring in contact with the flat bottomed portion of said top closure means, exerting an axially compressive force thereon, to cause said top closure means to urge said insulating sealing grommet against the rim of said metal can and simultaneously against the upper portion of said insulating supporting member;
7. the upper rim of said metal can being crimped down to press against said sealing grommet to thereby seal the cell.

2. An electric current producing cell comprising:
1. a metal can constituting one of the terminals of the cell, said can having an upper rim which is subsequently crimped to seal the cell;
2. a first active cell material of one polarity lining the inner surface of the metal can;
3. a second active cell material of opposite polarity within and spaced from said first material;
4. an absorbent spacer layer containing a cell electrolyte interposed between said active materials;
5. an insulating material within said spacer and disposed between said second active cell material and the bottom surface of the metal can;
6. a top closure means for said can constituting the other terminal for the cell, said top closure means comprising an inverted flat bottomed dish having a side wall extending downwardly away from the center of the flat bottomed portion of said dish, said side wall terminating in a rim wall extending circumferentially around said side wall and outwardly away from the center of the flat bottomed portion of said dish, and said rim wall terminating in a U-shaped wall opening upwardly and facing outwardly away from the center of the flat bottomed portion of said dish and being substantially perpendicular thereto;
7. an insulating sealing grommet confined between cooperating portions of said can and of said top closure means;
8. a radial constriction in the upper wall portion of said metal can and spaced below said sealing grommet;
9. an insulating supporting member positioned into the space below said sealing grommet, with the upper portion thereof positioned above said radial constriction and shaped to fit flush with both said sealing grommet and said radial constriction;
10. a helical contact spring in contact with the flat bottomed portion of said top closure means, exerting an axially compressive force thereon, whereby said contact spring electrically connects the flat bottomed portion of said top closure means to the second active cell material and simultaneously causes said top closure means to urge said insulating sealing grommet against the rim of said metal can and simultaneously against the upper portion of said supporting member;
11. the upper rim of said metal can being crimped down to press against said sealing grommet to thereby seal the cell.

3. The cell as claimed in claim 2 wherein said supporting member comprises an annular disc having a flanged outer shoulder, and wherein said radial constriction is positioned above said first active cell material.

4. The cell as claimed in claim 3 wherein said flanged outer shoulder comprises an upper portion and a lower portion, said upper portion being of right angular cross-section to fit in simultaneously contact with said sealing means and with said metal can wall, and said lower portion being of concave curvature corresponding to the curvature of said radial constriction.

* * * * *